United States Patent [19]
Foulke

[11] 4,110,980
[45] Sep. 5, 1978

[54] APPARATUS FOR PRODUCING MECHANICAL KINETIC ENERGY FROM FALLING WATER

[76] Inventor: Willing B. Foulke, 109 Greenridge Rd., Wilmington, Del. 19805

[21] Appl. No.: 841,823

[22] Filed: Oct. 13, 1977

[51] Int. Cl.² .............................................. F16D 33/00
[52] U.S. Cl. ...................................... 60/325; 60/398; 417/108; 417/404
[58] Field of Search ................. 60/325, 398, 407, 412, 60/327; 417/90, 108, 150, 404; 61/19, 1 R

[56] References Cited
U.S. PATENT DOCUMENTS

| | | | |
|---|---|---|---|
| 543,410 | 7/1895 | Taylor | 417/150 |
| 1,069,162 | 8/1913 | Nickerson | 417/90 X |
| 1,339,137 | 5/1920 | Rogers | 417/108 |
| 1,449,523 | 3/1923 | McGinn | 417/150 |
| 1,746,165 | 2/1930 | Porte | 417/404 X |
| 1,811,295 | 6/1931 | Blow | 417/108 |
| 2,461,032 | 2/1949 | Bush | 417/108 |
| 2,864,317 | 12/1958 | Robinson | 417/90 |

FOREIGN PATENT DOCUMENTS

| | | | |
|---|---|---|---|
| 280,182 | 12/1930 | Italy | 417/404 |
| 210,228 | 1/1924 | United Kingdom | 417/150 |

*Primary Examiner*—Edgar W. Geoghegan
*Attorney, Agent, or Firm*—George A. Smith, Jr.

[57] ABSTRACT

Agitation of the surface of a body of water by a falling stream of water results in the entrainment of air bubbles which are carried underneath the surface. These air bubbles are collected in a tank having a submerged open bottom. Air pressure is produced within the tank and utilized to perform useful work by operating a pneumatic pressure transformer which in turn produces high pressure air for operating a series of air-lift pumps. In an alternative embodiment a reciprocating piston motor or turbine is positioned in a path of flow between a portion of the body of water containing relatively few air bubbles and another portion containing a relatively large quantity of bubbles. Flow through this path takes place by reason of a difference in densities and is available to do useful work.

12 Claims, 3 Drawing Figures

APPARATUS FOR PRODUCING MECHANICAL KINETIC ENERGY FROM FALLING WATER

BACKGROUND OF THE INVENTION

This invention relates to hydraulic energy systems, and particularly to systems which utilize the potential energy of submerged air bubbles produced by a waterfall.

In the past, a number of proposals have been made for hydraulic air compressors in which the kinetic energy of a stream of water falling from a higher level to a lower lever is utilized to compress air. Among such proposals is the one described in U.S. Pat. No. 1,449,523, dated May 27, 1923, wherein a conduit constructed underneath a dam is provided with an air collection chamber buried below the dam. The upstream end of the conduit is in the form of a widened vertical conductor, extending upwardly into the body of water behind the dam, and having an air duct disposed in it in such a way as to provide a surrounding annular passage for the flow of water. The upper end of the air duct communicates with the atmosphere, and a plurality of short air suction nozzles project radially from the duct into the annular passage. An overhanging device is provided above each nozzle to increase the flow of air from the air duct into the stream of water flowing through the annular passage. Bubbles formed as a result of the action of the nozzles are carried by the stream through the conduit, and air from the bubbles is collected under pressure in the submerged chamber.

Similar systems utilizing vertically extending conduits and special air introduction devices are described in McGinn British Pat. No. 210,228, dated Jan. 31, 1924, Taylor U.S. Pat. No. 543,410, dated July 23, 1895, and in Kirshner, *Fluid Amplifiers*, McGraw-Hill, 1966, pp. xii-xiii, the latter showing a pneumatic system for lifting water installed by Priestly in 1890 at Snake River Desert, Idaho.

In the McGinn and Taylor systems, suction devices are used to introduce air into the downwardly flowing stream of water. In the Priestly apparatus a stream of water was trained into a pipeline extending down a bluff in such a way that a considerable quantity of air was carried down along with the water in the pipeline for collection in an inverted air reservoir near the bottom of the bluff.

The present invention represents an improvement over the foregoing systems in that it requires no vertically extending water conduit, and no special apparatus for entraining air into the stream of water flowing through the conduit. In accordance with the invention, advantage is taken of the fact that a stream of water falling into a body of water produces agitation at the surface which results in the formation of bubbles, and carries the bubbles thus formed a distance below the surface. More specifically, the impact of the falling stream of water onto the surface of the body of water is believed to result in the repeated formation of depressions or pockets in the surface of the water. These pockets are closed by reason of the continuous inward flow of water at the surface, and air is entrapped in the form of bubbles. The downward momentum of the falling stream then carries the bubbles for a distance underneath the surface where they are compressed by the head of water in accordance with their depth.

In many cases, these bubbles rise from a considerable depth, and therefore carry substantial potential energy in the form of air pressure. This potential energy is present in natural and artificial waterfalls. In many hydroelectric plants, there is an overflow at some time during the daily operation of the plant which results in an artificial waterfall.

In each case, bubbles are carried underneath the level of a body of water to a depth such that substantial amounts of potential energy are produced.

The potential energy of the submerged bubbles is captured by means of an open-bottomed collection tank which is at least partially submerged and located in a position so as to collect the maximum amount of entrained air. A pressure greater than atmospheric is built up in the collection tank which may be utilized in various ways.

The collected air may be simply stored under pressure for later use, or it may be used directly at the pressure at which it is collected.

Alternatively, the collection tank may be interconnected with a pressure transformer in order to produce air under high pressure. In conjunction with the pressure transformer, valving may be so operated as to produce a reciprocating action so as to produce a sustained flow of air under high pressure.

The high pressure air flow so produced may be used to operate and air-lift pump to raise water, either from the body of water into which the waterfall flows or from another body of water, to a high level.

Finally, the pressure so produced may be used to operate a series of specially adapted air-lift pumps in accordance with the invention which may be utilized to lift water to any desired height.

This high pressure air may also be used wherever compressed air is useful; for example, in the operation of air tools, or in supercharging stationary internal combustion engines.

In accordance with an alternative embodiment of the invention, a reciprocating piston motor or turbine is positioned in a path of flow between a part of a body of water containing relatively few air bubbles and another part of the body of water into which a relatively large quantity of bubbles has been carried by a stream of falling water. Flow through this path takes place by virtue of the difference in densities in the two parts, and is available to do useful work.

The principal object of this invention is to produce useful work from falling water, while eliminating the need for special and elaborate flow passages and air entrainment devices formerly considered necessary.

Another object of the invention is to provide a simple and effective apparatus for producing useful work from a stream of falling water.

Further objects will be apparent from the following detailed description when read in conjunction with the drawings.

DETAILED DESCRIPTION

Figure 1:
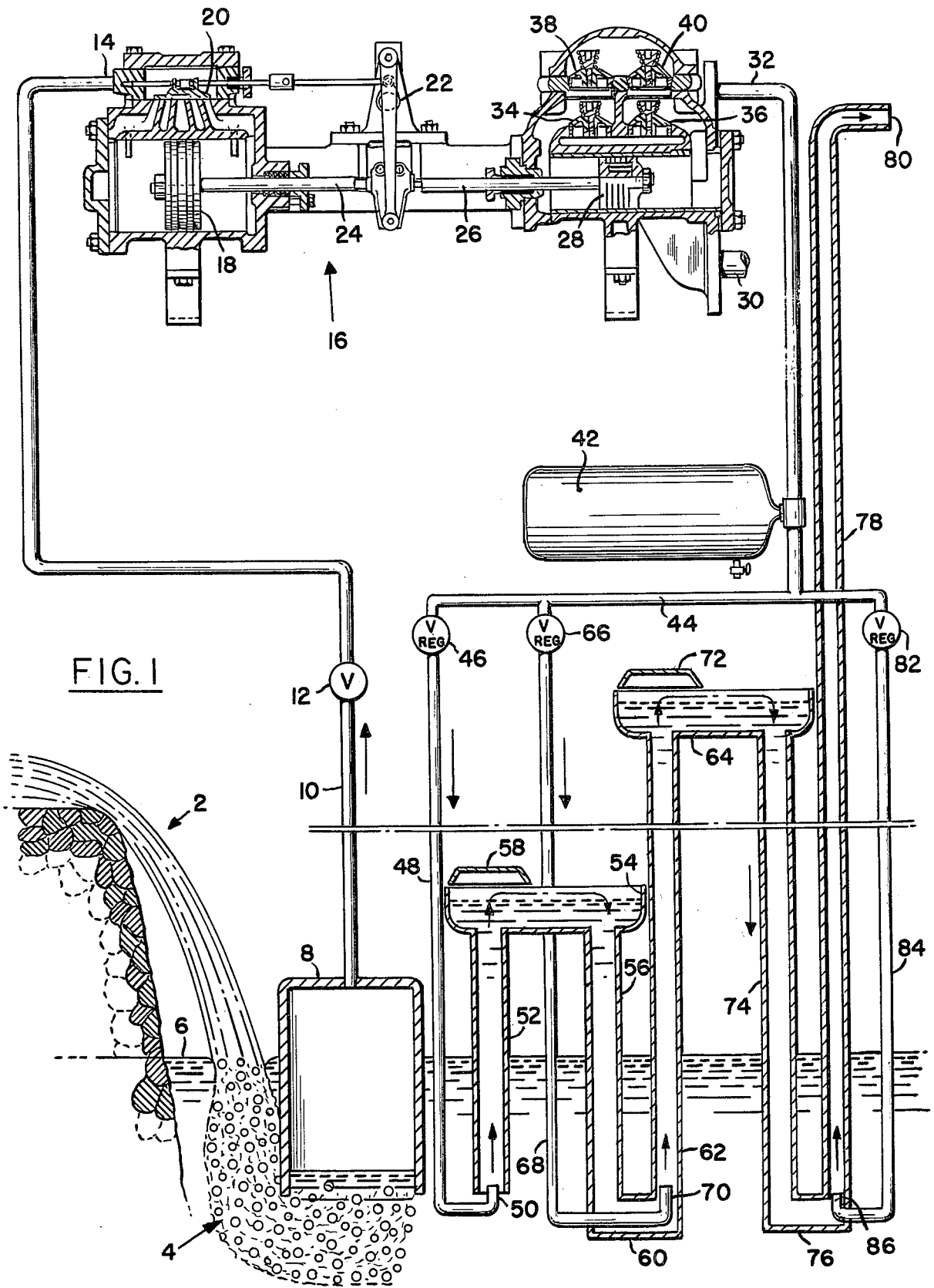
FIG. 1 is a schematic diagram showing the waterfall, the collection tank, the pressure transformer, a multiple-stage pump, and the interconnections between them.

FIG. 1 shows a stream 2 of water falling downwardly through the air to, and agitating the surface 6 of, a body of water. Bubbles 4 are formed as a result of agitation of surface 6 by falling stream 2, and are carried well below surface 6 by the momentum of the stream. A collection tank 8 having an open bottom is positioned adjacent the waterfall, and preferably positioned downstream with respect to the waterfall in the direction of flow of the body of water so that the maximum amount of air is collected. The collection tank 8 is held with its opening positioned underneath the surface 6 at a distance which depends upon the distance to which air is carried below the surface, and also the pressure which is desired in tank 8. As air accumulates in tank 8, the level of the water in the tank descends. The air pressure in the tank is proportional to the difference between the level of water in the tank and the level of the body of water.

Pressurized air from tank 8 is delivered through a conduit 10 and control valve 12 to inlet port 14 of a conventional duplex-piston pump 16. The function of the duplex-piston pump is to transform the pressure of the air delivered to it through conduit 10 to a higher pressure. The air, entering the pump at port 14, is delivered alternatively to chambers on opposite sides of a piston 18 by a slide valve 20 controlled by a conventional valve-motion 22. The slide valve also provides for venting, in the conventional manner, of the chamber of the cylinder to which air is not being delivered. The valve-motion is controlled by piston rod 24 so that a continuous reciprocating motion of the piston is effected.

Extension 26 of rod 24 causes reciprocation of a second piston 28 which is preferably smaller in diameter than piston 18. Atmospheric air enters at port 30, and is delivered through pot 32 under high pressure, there being provided in conjunction with piston 28, a pair of inlet check valves 34 and 36, and a pair of outlet check valves 38 and 40.

Because of the difference in diameters of pistons 18 and 28, the relatively low air pressure at port 14 is transformed into a relatively high pressure at port 32. Pump 16 produces a continuous, pulsating flow of air at port 32. The pulsations are smoothed out by accumulator 42. The pulsations may be further smoothed out by the provision of one or more additional sets of pistons which operate out of phase with pistons 18 and 28.

Air pressure from port 32 is delivered to header 44. A first pressure regulating valve 46 connects header 44 with conduit 48. Conduit 48 delivers air from the regulating valve 46 to a nozzle 50 which is located at the bottom of a partially submerged drop pipe 52, the bottom of which is open and in communication with the body of water. Nozzle 50 and drop pipe 52, together, constitute a conventional air-lift pump in which bubbles emitted from nozzle 50 mix with the water standing in drop pipe 52, decreasing its effective density and raising the level of the water thus affected so that it flows into vessel 54. Vessel 54 is located above surface 6 of the body of water, and is open to the atmosphere so that the air carried with the water upwardly through pipe 52 is allowed to escape. The water in the vessel 54 rapidly reacquires its normal density, and flows downwardly through pipe 56. A shield 58 is located above the upper opening of drop pipe 52 to prevent the loss of water which would otherwise occur as a result of the activity at the surface of the water in vessel 54. Pipe 56 connects through horizontal interconnection 60 with a second vertical drop pipe 62, which leads upwardly into a vessel 64, which is similar to vessel 54, but located at a higher elevation. Air, from header 44, is delivered through regulating valve 66 to nozzle 70, which is located at the bottom of drop pipe 62. Nozzle 70, together with drop pipe 62, acts as a second air-lift pump, raising water from vessel 54 into vessel 64. A shield 72, similar to shield 58, is provided above the upper opening of drop pipe 62.

The assembly, including drop pipe 56, interconnection 60, and pipe 62, is closed so that there is no communication with ambient pressure except at the location of vessels 54 and 64. While the bottom of pipe 62 is shown as located below surface 6 of the body of water, this is not necessarily the case. However, downwardly extending pipe 56 provides for submergence, which is necessary to the operation of any air-lift pump.

A vertical pipe 74 extends downwardly from vessel 64, and is interconnected through horizontal interconnection 76 with upwardly extending pipe 78. Pipe 78 communicates with outlet 80. Air under pressure is delivered from header 44, through regulating valve 82 and conduit 84 to nozzle 86, which, together with pipe 78, provides a third air-lift pump.

The regulating valves 46, 66, and 82 are preferably adjusted so that conduit 84 carries the highest pressure, conduit 68 carries a somewhat lower pressure, and conduit 48 carries a still lower pressure. Such adjustment provides for the most efficient use of the available air in header 44.

It will be apparent that the number of air-lift stages may be varied as desired, and that the system is capable of lifting water to great heights, using a source of energy which would normally be wasted.

Figure 2:
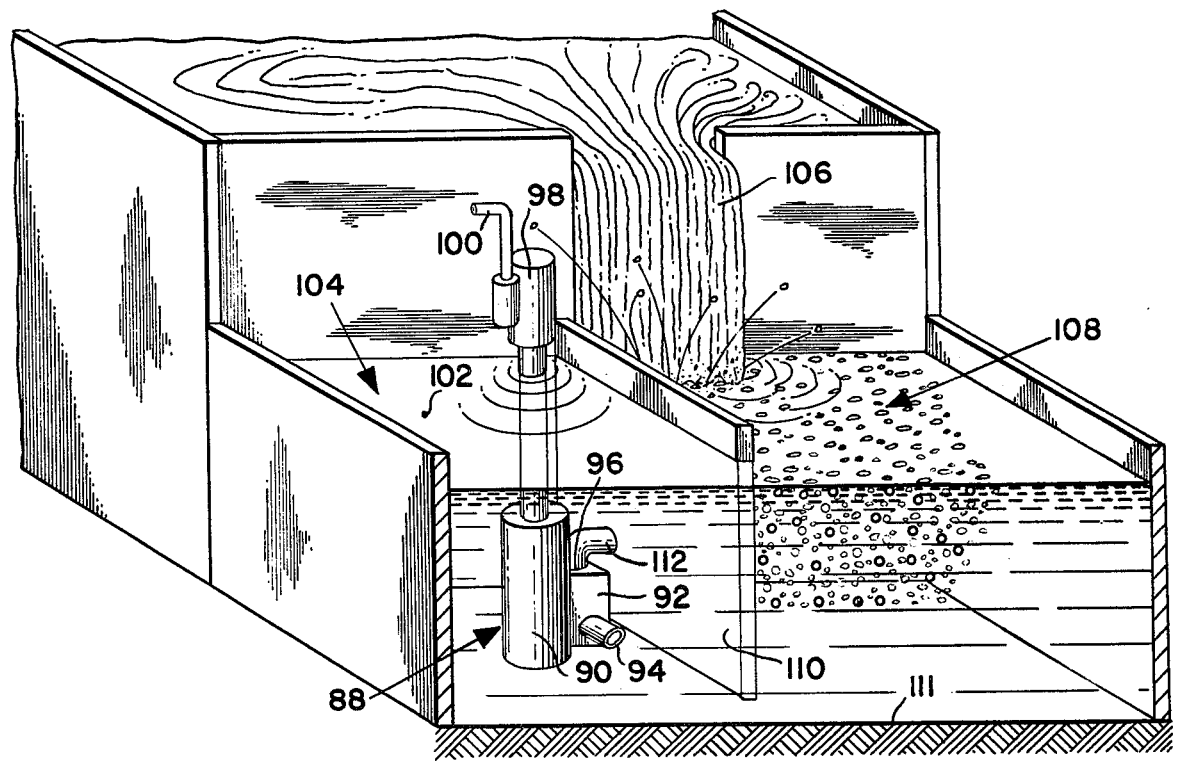
FIG. 2 is an oblique perspective view illustrating an embodiment of the invention in which a reciprocating piston motor is arranged in a flow path between two portions of a body of water, one containing bubbles.

FIG. 2 shows an alternative embodiment comprising a reciprocating piston motor 88. Motor 88 is essentially identical to the driving piston and cylinder assembly of pump 16 (FIG. 1). Motor 88, therefore, comprises a cylinder 90 having a valve assembly 92 and a vertically reciprocating piston, the movements of which control the valve in valve box 92. Valve box 92 has an inlet port 94 and an outlet port 96. The valve is arranged, in a manner similar to valve 20 in FIG. 1, to produce alternation between a first condition in which one side of the piston is in communication with port 96 and the other side of the piston is in communication with port 94, and a second condition in which said one side of the piston is in communication with port 94 and the other side of the piston is in communication with port 96. It will be observed that if the pressure at port 94 differs from the pressure at port 96, a flow will take place from the high pressure to the low pressure side, and reciprocation of the piston will take place. The piston in motor 88 can be arranged to operate a high pressure air pump 98, having an outlet 100, in which event the assembly of motor 88 and pump 98 is essentially identical to the duplex-piston assembly shown in FIG. 1.

Motor 88 is submerged below surface 102 of a body of water 104. A stream of falling water 106 falls into surface 102, and agitation at the surface produces air bubbles 108, which are carried by the falling stream of water to a depth substantially below surface 102. A vertical partition 110 preferably extends from a location above surface 102 to the bottom 111 of body of water 104. Partition 110 is arranged on one side of falling stream 106, and divides the body of water 104 into a first portion on the right-hand side of the partition and a second portion on the left-hand side. The partition resists the migration of submerged bubbles from the first portion to the second portion, and consequently there are substantially fewer air bubbles in the second portion of the body of water 104 on the left-hand side of partition 110. The partition should not completely isolate one portion of body of water 104 from the other, but should provide a flow path for flow of water from the right-hand side to the left-hand side of the partition at a location sufficiently remote from falling stream 106 that most of the air bubbles will have risen to the surface before the water containing them passes around the partition.

Port 94 can be located at any depth in the portion of body of water 104 on the left-hand side of the partition. Port 96 is connected to pipe 112, which extends through partition 110 to the opposite side of the partition. The opening of pipe 112 on the opposite side of the partition is preferably located at a depth at least substantially equal to the maximum depth to which bubbles are carried on the right-hand side of the partition. The opening of pipe 112 can be located at a greater depth, but, as will be seen, a greater depth of the opening of pipe 112 makes no appreciable difference in the performance of the system.

The presence of air bubbles 108 on the right-hand side of partition 110 results in a decrease in the average density of the water on the right-hand side of the partition, and consequently produces a pressure difference between ports 94 and 96. Motor 88 utilizes this pressure difference to produce mechanical kinetic energy to operate air pump 98. The operation of motor 88 is characterized by a flow of water into port 94 and through port 96 and pipe 112 to the opposite side of partition 110. A return flow takes place around the partition.

The maximum pressure differential across the piston in motor 88, and therefore the maximum power output of the motor, occurs when the opening of pipe 112 is substantially at the depth of the lowest bubble in body of water 104. Placing the opening of pipe 112 at a further depth makes little or no difference in the pressure differential. Similarly, it does not matter at which depth port 94 is located, so long as it is submerged in the portion of body of water 104 on the left-hand side of partition 110. While motor 88 is shown in a submerged condition, it is not necessary that it is submerged, and it is possible that a reciprocable piston motor, at any location, either above or below surface 102, could be connected, for example, between a point just below surface 102 on the left-hand side of the partition, and a point just below the depth of the deepest bubble on the right-hand side of the partition. Consequently, it will be appreciated that the arrangement shown is only one example of a large number of possible arrangements which can be used.

Figure 3:
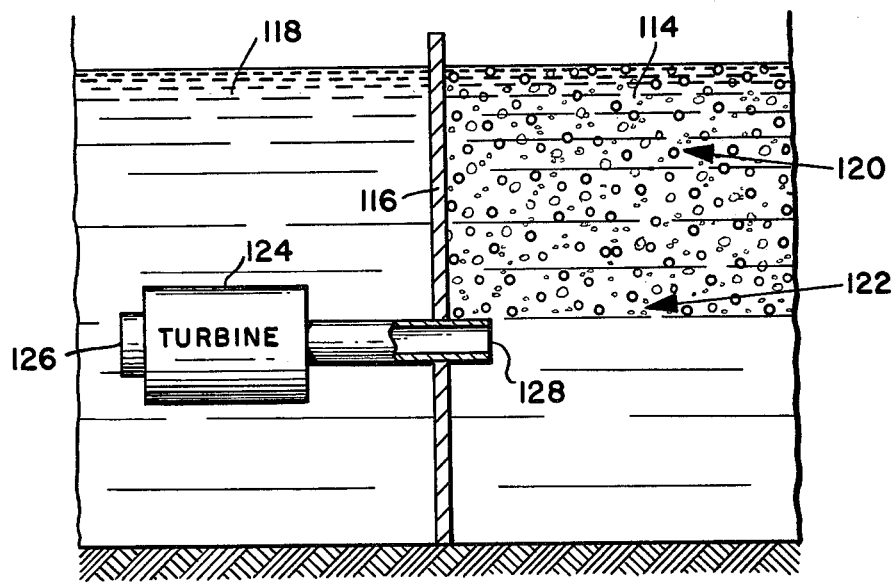
FIG. 3 is a schematic diagram of a system in which a water-operated turbine is arranged in a flow path between two portions of a body of water.

FIG. 3 shows a system similar to that in FIG. 2 in which a body of water is divided into a first portion 114 on the right-hand side of a partition 116 and a second portion 118 on the left-hand side of the partition. Bubbles 120 are induced in portion 114, preferably by a stream of water falling into and agitating the surface, and are carried by the falling stream of water to a maximum depth indicated at 122. A water turbine 124, preferably of the reaction type, has an inlet 126 in communication with the water in portion 118, and an outlet 128 which communicates with the water in portion 114 at a depth substantially equal to or greater than depth 122. The greater average density of the water in 118 causes a flow to take place through the turbine from inlet 126 to outlet 128, thereby operating the turbine rotor, which can be connected through suitable shafts and gearing or other transmission devices to do useful work, for example the pumping of air or water.

Again, the position of outlet 128 of the turbine is important for maximum power output. On the other hand, the position of the turbine itself and the position of inlet 126 are relatively unimportant.

The embodiments shown in FIGS. 2 and 3 may take advantage of surface agitation of a falling stream of water to induce bubbles, or alternatively they can take advantage of the various artificial means for inducing submerged bubbles which have been described.

The barriers which resist the migration of bubbles from one portion of the body of water to another are desirable in that they allow the reciprocable piston motor or reaction turbine to utilize relatively short inlet and outlet pipes which, by virtue of their short lengths, exhibit relatively little resistance to the flow of water and therefore do not contribute to friction losses. It is possible, however, to eliminate the barriers, if sufficiently long pipes are used to provide equivalent isolation. For example, in FIG. 2, if inlet port 94 were connected through a long pipe to a point sufficiently remote from falling stream 106 so as not to have a large number of submerged bubbles, barrier 110 could be eliminated. However, the elongated pipe could exhibit a substantial resistance to flow, which would reduce the effeciency of the motor.

The various embodiments of the invention herein described can be used in conjunction with natural waterfalls without appreciably disturbing their esthetic appearance. They can also be used as an adjunct to gravity-operated water wheels or impulse or reaction turbines operated by falling water to take advantage of lost power and thereby improve overall plant efficiency.

I claim:

1. Apparatus for producing mechanical kinetic energy from falling water comprising:
  a body of water having a surface;
  means, comprising a stream of water falling downwardly into and agitating said surface, for inducing air bubbles in a portion of said body of water and carrying said bubbles through a substantial distance below the surface thereof; and
  motor means communicating with said portion of said body of water and responsive to the potential energy of the air bubbles in said first portion of said body of water, to produce mechanical kinetic energy.

2. Apparatus for producing mechanical kinetic energy from falling water comprising:
  a body of water having a surface;
  means, comprising a stream of falling water, for inducing air bubbles in a first portion of said body of water and carrying said bubbles through a substantial distance below the surface thereof; and
  motor means communicating with said first portion of said body of water and with a second portion thereof containing substantially fewer air bubbles than said first portion, said motor means being responsive to the difference in density between the contents of said first and second portions to produce mechanical kinetic energy and being characterized in its operation by flow of water through said motor from said second portion to said first portion.

3. Apparatus according to claim 2 comprising partition means for resisting the migration of submerged bubbles from said first portion to said second portion, said partition means providing a path for the passage of water from said first portion to said second portion.

4. Apparatus according to claim 2 comprising partition means for resisting the migration of submerged bubbles from said first portion to said second portion, said partition means providing a path for the passage of water from said first portion to said second portion, and said partition means having a passage therethrough for the flow of water through said motor from said second portion to said first portion.

5. Apparatus according to claim 2 in which said motor means communicates with said first portion of said body of water through a port located in said first portion at a depth at least substantially equal to the maximum depth to which bubbles are carried in said first portion.

6. Apparatus according to claim 2 in which said motor means communicates with said first portion of said body of water through a port located in said first portion at a depth substantially equal to the maximum depth to which bubbles are carried in said first portion.

7. Apparatus according to claim 2 in which said motor means is a reciprocating piston motor.

8. Apparatus according to claim 2 in which said motor means comprises a cylinder, a piston reciprocable therein and valve means for producing alternation between a first condition in which one side of said piston is in communication with said first portion and the other side of said piston is in communication with the second portion and a second condition in which said one side of said piston is in communication with said second portion and said other side of said piston is in communication with said first portion, whereby said piston is caused to reciprocate in said cylinder.

9. Apparatus according to claim 2 in which said motor means is a water-operated turbine.

10. Apparatus according to claim 2 in which said stream of falling water is arranged to fall into and agitate the surface of said first portion of said body of water.

11. A pumping system comprising a body of water having a surface, means providing a stream of water falling downwardly into and agitating said surface, a collection tank having an open bottom positioned adjacent the stream and underneath said surface, whereby air entrained as a result of agitation of said surface by said stream is carried downwardly into the body of water in bubble form and collected in the tank under a pressure greater than atmospheric, and means for conducting compressed air away from the collection tank.

12. A pumping system according to claim 11 in which said body of water is a flowing body, and in which the open bottom of said tank is positioned downstream in said body of water from the location at which said falling stream of water falls into the surface of said body.

* * * * *